Figure 1:
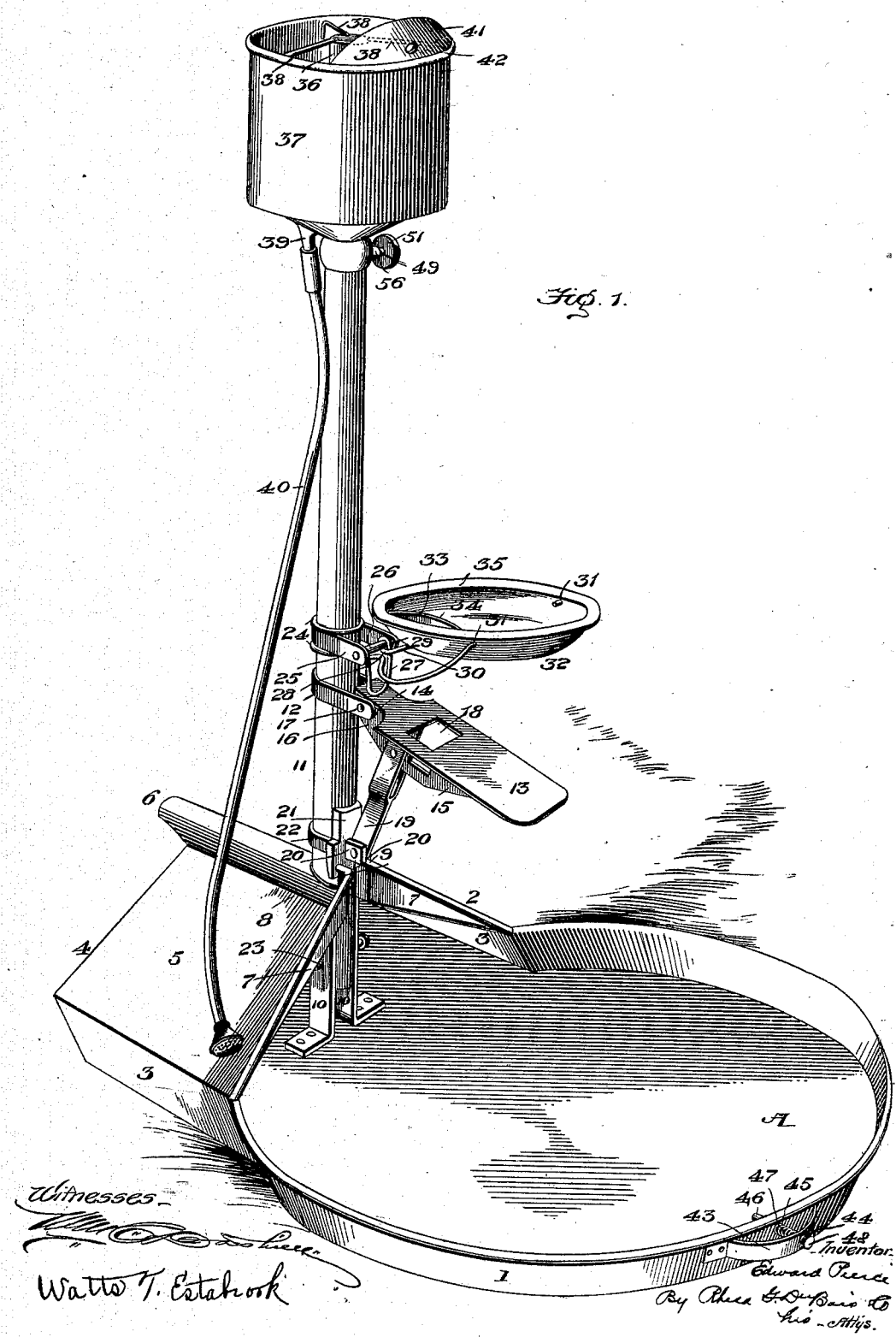

No. 716,096. Patented Dec. 16, 1902.
E. PIERCE.
PORTABLE BATHING PAN.
(Application filed Apr. 12, 1902.)

(No Model.) 2 Sheets—Sheet 1.

Witnesses
Watts T. Estabrook

Inventor
Edward Pierce
By Rhea G. DuBois & Co.
his Attys.

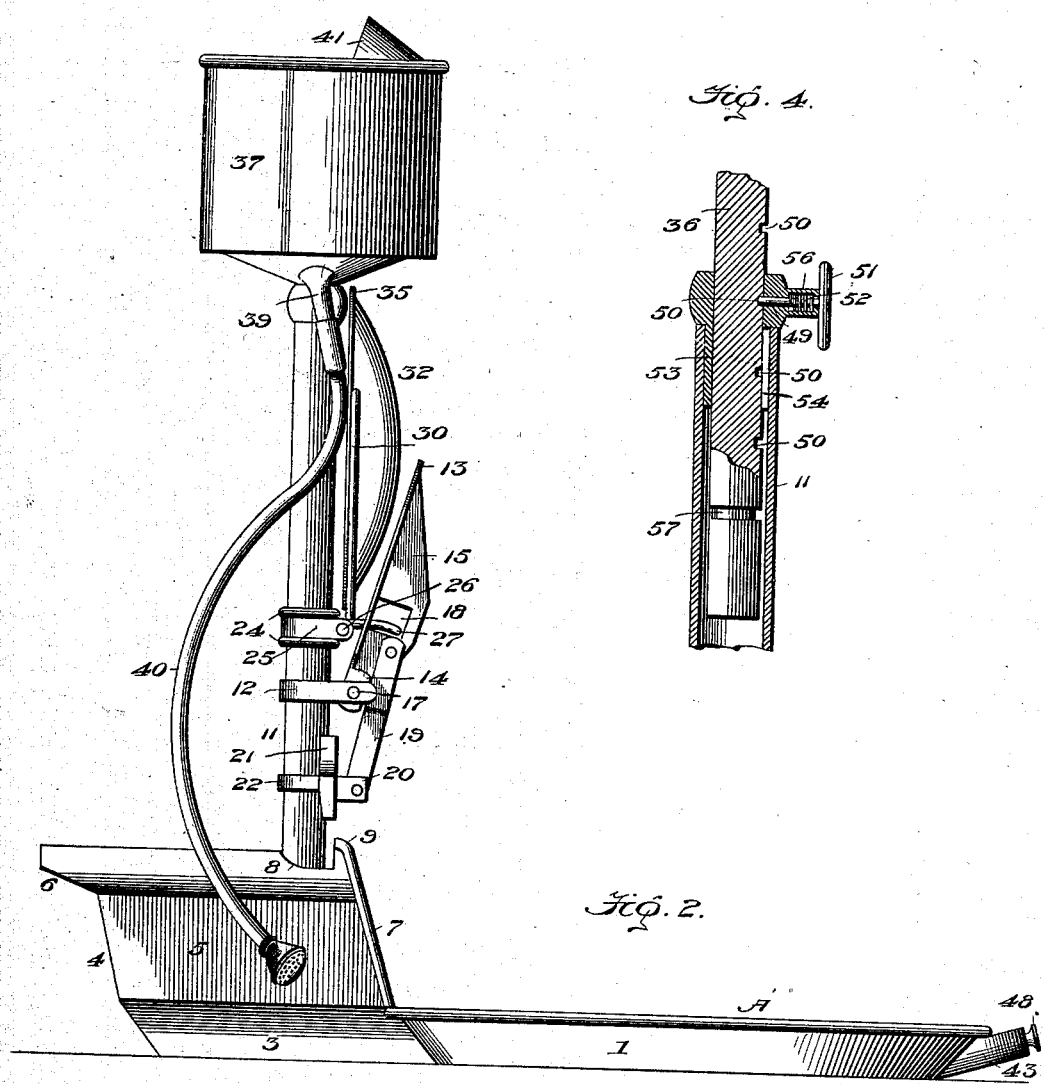
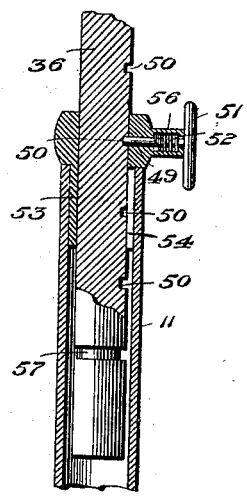
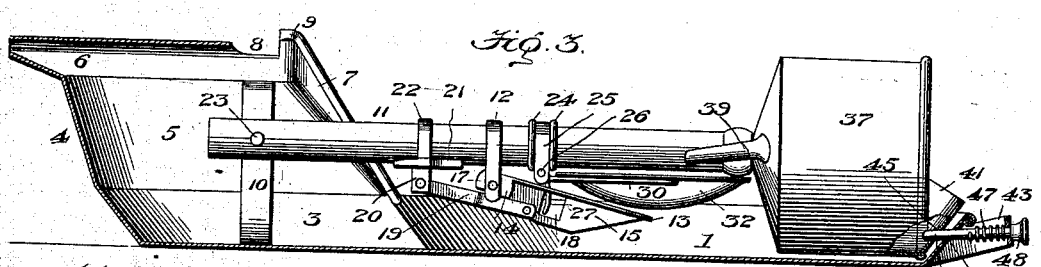

UNITED STATES PATENT OFFICE.

EDWARD PIERCE, OF WEST BURLINGTON, IOWA.

PORTABLE BATHING-PAN.

SPECIFICATION forming part of Letters Patent No. 716,096, dated December 16, 1902.

Application filed April 12, 1902. Serial No. 102,626. (No model.)

*To all whom it may concern:*

Be it known that I, EDWARD PIERCE, a citizen of the United States, and a resident of West Burlington, in the county of Des Moines and State of Iowa, have invented new and useful Improvements in Portable Bathing-Pans, of which the following is a specification.

My invention relates to an improvement in portable bathing-pans, the advantages of which construction over the prior art consists in its compactness and completeness, the ease with which it can be erected for use and packed for transportation, and its simple yet strong construction.

My invention consists in a receiving receptacle or pan above which is erected a discharge-receptacle when the pan is to be used, the discharge-receptacle connected with the pan and fitting thereinto when the device is to be transported.

My invention further consists in novel means whereby the discharge-receptacle is retained in its upright or erected position, in novel means whereby the various appurtenances are received within and locked to one another when the device is out of use, and in other mechanisms of no minor importance, all of which will be fully described hereinafter and particularly set forth in the claims.

In the accompanying drawings, Figure 1 is a perspective view of my device looking down upon it. Fig. 2 is a side elevation showing the parts in position for folding the upright standard. Fig. 3 is a view in vertical section, and Fig. 4 is a detail.

A indicates the pan. This pan is of generally circular shape and is provided with an upstanding flange 1, which may be inclined, as shown, encircling the bottom portion of the pan and forming a part thereof. The bottom portion of the pan is provided with an offset 2, having sides 3, end 4, and top 5. The sides 3 3 are continuations of the flange 1 and are connected to the undercut end 4, which is of a generally triangular shape and extends above the plane of the sides 3 3. The top 5 is sloping, its ends being connected to the sides 3 3 and the sides connecting with the edges of the triangular-shaped end 4. The upper adjacent ends of the top 5 meet in and form a spout 6, projecting past the end 4. The spout is provided with a cut-away portion or opening 8 in its upper inner end. Flanges 7 7 are provided upon the free sides of the inclined top, which flanges are suitably strengthened at their upper edges. These flanges are of gradually-increasing height as they approach the cut-away portion or opening 8 and are slightly curved at their extreme upper ends, as at 9 9. Upright braces 10 10, secured to the bottom portion of the pan, support the roof or top 5 of the offset portion 2 of the pan, to which the braces are secured on either side of the opening 8, formed in the spout 6. Pivotally supported by and between these braces 10 10 at point 23 is a socket or hollow tube 11. This tube or socket has secured thereto in any convenient manner a clip 12, in which is pivoted a foot-rest 13, which foot-rest may be formed in any suitable manner, as by stamping out of sheet metal, and is provided with a pair of ears 14 14 and with a longitudinally-extending strengthening-rib 15. The ears are formed on the narrow portion 16 of the foot-rest received between the arms of clip 12, and passing through the ears and through the rib 15 is a bolt or pivot-stud 17, securing the foot-rest to the clip. An aperture or slot 18 is cut in the foot-rest plate 13 and in the strengthening-rib 15 for a purpose hereinafter set forth. A link 19 is pivotally secured at one end to the strengthening-rib 15, the rib being received between the ends of the link, the opposite end of the link being pivotally held between the lugs 20 20 of a flat-faced plate 21, the rear face of the plate having a curved groove formed therein, which fits against and permits the plate to reciprocate upon the tube 11. This plate 21 is of wedge shape and is slidably secured on the tube by means of band 22 embracing the tube, the ends of the band being secured to the plate.

The tube 11 is adapted to be raised or erected above the pan A, swinging on its pivot 23 in the braces and passing between the curved ends 9 9 of the flanges 7 7, which are slightly resilient and yield to permit the passage of the tube therethrough, and is received in the opening 8 formed in the spout. The foot-rest, which when not in use is raised approximately parallel with the tube 11, is now swung downwardly on its pivot, thereby sliding the wedge-shaped plate 21 on the tube, the plate passing behind the curved ends 9 9 of the flanges 7 and on account of its shape serving to tightly bind the tube between itself and the edge of the opening 8 in the spout, thus retaining the tube in its upright position. The tube is provided with a plurality of collars 24 above the clip 12, and rotatably received between these collars is a second clip 25, embracing the tube, the extended ends of which collar are connected by a stud or pin 26. Journaled upon this pin 26 is a resilient frame, of wire or other suitable material, comprising a leg 27, having a flattened portion 28. The material then is bent or formed into loops 29 29, encircling the stud or pin 26, from which loops divergent arms 30 30 extend upwardly. Pivotally held upon the inturned ends 31 31 of these arms is a receptacle 32 in the form of a basin, a portion of which receptacle is reversed for a soap-rack 33 by means of a wall 34, located near the edge thereof. This receptacle, it will be observed, when in use occupies a substantially horizontal position, a ledge or flange 35, projecting from the upper edge of the receptacle, resting upon the arms 30 30; but when it is desired to empty the receptacle it may be revolved upon the inturned ends 31 31 of the arms, thus inverting the receptacle upon the foot-rest plate 13. The ledge 35 serves to limit the amount of rotation of the receptacle by contacting with the ends of the arms 30 30. The arms extend from between the loop forming the leg 27, thereby preventing them from spreading.

When the receptacle is not in use, the arms and the basin are swung upwardly into a position substantially parallel with the tube 11, the leg 27 projecting at right angles thereto and received within the recess or aperture 18, formed in the foot-rest plate 13 and the strengthening-rib 15, when the latter are swung upward out of use.

While in use the flattened portion 28 of the leg 27 bears upon the narrow portion 16 of the foot-rest plate 13, above the pivotal point thereof, which serves to retain the foot-rest plate 13 in its extended position, with the wedge-plate 21 behind the curved ends 9 9 of the flanges 7 7, and prevent any accidental shifting of plate 21 while the tube is in elevated position. The foot-rest plate when in use occupies a downwardly-inclined position and may be used without the receptacle. The contact of the leg 27 with portion 16 of the foot-rest plate also serves to limit the movement of the receptacle-supporting arms 30 30 in one direction.

Telescopically received within the tube 11 is a post 36, bearing at its upper end a large receptacle or tank 37. The post extends vertically upward through the tank to the top thereof, and braces 38 38 extend from the extreme upper end of the post 36 to the sides of the tank. The bottom of the tank is funnel-shaped and is provided with an eduction-pipe 39, projecting downwardly therefrom. A sprayer may be connected, by means of a hose 40, with this outlet-pipe, whereby a shower-bath may be obtained.

A segmental flange 41 is secured at its edges to a portion of the upper edge of the tank, and this flange is provided with an aperture 42. A handle 43, located on the encircling flange 1 of the pan A, is provided. Holes 44 45 are formed in the handle and in the flange 1, respectively, as shown. A bolt 46 is slidingly received in these holes, the bolt carrying a coiled spring 47, one end of which bears against and is secured to the bolt and the other end of which bears against the inner face of the handle. A finger-piece 48 is located on the end of the bolt, outside of the handle, and serves as an abutment to limit the movement of the bolt in one direction. The bolt is normally retained in locked position by the spring. When the device is out of use and the tube and post, with their accompanying appurtenances, are folded into the pan, the inner end of the bolt is received within the aperture 42 and locks the pivoted member in its folded position ready for transportation.

The post 36 is telescopically and rotatably received within the tube or socket 11 and is made adjustable as to height by means of a locking-stud 49, the inner end of which is received in any one of a series of apertures 50 on the post 36. This stud is located in a removable sleeve 53, received in the upper end of the socket 11. The outer end of the stud is provided with a finger-piece 51, whereby the stud is withdrawn from an aperture when it is desired to raise or lower the post. A spring or other tension device 52 operates to normally retain the pin in contact with the walls of the notch. The sleeve 53, which carries the stud 49, consists of a compressible member 54, normally of slightly-larger diameter than the socket 11 in which it is received and by which it is compressed and retained by friction therein. The upper end 55 of this sleeve is enlarged and provided with an apertured projection 56, in which the stud operates. An annular groove 57 is formed in the post near its lower end, and the stud is adapted to enter this slot, which marks the highest point of elevation of the tank. The extreme lower end of the post is slightly enlarged to prevent the sleeve from being passed thereover accidentally and separated therefrom.

The manner of use and the operation of my device may be gathered from the foregoing, in connection with the drawings, and it is not considered necessary to elaborate thereupon at this time.

The device is designed, as its name implies, as a portable bathing-pan, one that can be erected for use or folded up into small space in very little time, being convenient, easy to operate, and adapted to be transported from place to place or stowed away with the utmost ease and in the smallest possible space. It is simple, and yet affords all the pleasures to be derived from a shower-bath, together with the basin for washing the face and hands, which basin is located in close proximity to the foot-rest plate for supporting the feet for washing. If it is not desired to use the spraying device or a shower, it will not be necessary to raise the tank. The pan A catches and retains the water from the spray, and the water in the pan is emptied therefrom through spout 6. It is designed to take the place of the ordinary bath-tub used in places unprovided with water-works.

It is evident that many changes might be made in the form and arrangement of the several parts described without departing from the spirit and scope of my invention, and hence I do not desire to limit myself to the exact construction herein set forth; but

What I claim as new, and desire to secure by Letters Patent, is—

1. A portable bathing-pan comprising a body portion, a support pivotally secured to the body portion, a tank located on the support, the tank provided with an outlet, flexible conducting means secured to the tank around the outlet, and means on the support operating in connection with the body portion to removably retain the support in upright position.

2. A bathing-pan comprising a body portion, an offset formed thereon, an outlet formed in the offset, a support pivotally secured to the pan, a tank upheld by the support, means for locking the support in raised position above the pan and means for locking the tank and pan together when the support is in its lowered position.

3. A bathing-pan comprising a body portion, an offset connected therewith, flanges on the offset, an outlet formed in the upper portion of the offset, a support pivotally secured to the body portion, the support adapted to be received in an opening when in raised position and sliding means carried by the support, the means adapted to be received between the support and the flanges to retain the support in its upright position.

4. A bathing-pan comprising a body portion, an offset thereon, flanges formed on the offset, between which flanges is formed a slot, a support pivotally secured to the body portion, the support carried on the tank and received within the slot, a foot-rest plate secured to the support, a sliding member on the support to which the foot-rest plate is connected, the sliding member adapted to be interposed between the support and the flanges to retain the support in upright position.

5. A bathing-pan comprising a body portion, a covered offset connected therewith, flanges located on the offset between which is formed a slot, a support pivotally secured to the bathing-pan, the support carrying a tank and adapted to be received in the slot, a foot-rest plate pivotally secured on the support, a sliding member with which the foot-rest plate is connected, the sliding member adapted to be interposed between the support and the ends of the flanges when the support is in upright position, and a spout located in the cover portion of the offset.

6. A bathing-pan comprising a body portion, an offset connected therewith, flanges located on the offset portion, between which flanges is formed a slot, a support received within this slot, a sliding member carried by the support, the sliding member adapted to be interposed between the support and the ends of the flanges when the support is in upright position.

7. A bathing-pan comprising a body portion, an offset connected therewith, flanges located on the offset portion, between which flanges is formed a slot, a support received within this slot, a wedge-shaped sliding member carried by the support, the sliding member adapted to be interposed between the support and the ends of the flanges when the support is in upright position.

8. A bathing-pan comprising a body portion, a support pivoted thereto, the support adapted to be raised above and lowered into the bathing-pan, a tank carried by the support, arms pivotally connected to the support and a receptacle pivotally held by the arms.

9. A bathing-pan comprising a body portion, a support pivotally secured thereto, a foot-rest plate pivotally carried on the support, a sliding member on the support, the foot-rest connected to the sliding member, and adapted when in position for use to cause the sliding member to lock the support in raised position, arms pivotally secured to the support, a receptacle pivotally carried by the arms, a leg connected to the arms, the leg resting upon the foot-rest plate when the parts are in position for use, the leg received within an aperture in the foot-rest plate when the parts are in folded position and a tank located on top of the support.

10. A bathing-pan comprising a body portion, a pivoted support therein, a tank upheld by the support, arms pivotally secured on the support, a leg connected to the arms, the leg adapted to support the arms in a horizontal position, and a receptacle pivotally carried by the arms.

11. A bathing-pan comprising a body portion, a pivoted support therein, a tank upheld by the support, arms pivotally secured on the support, a leg connected to the arms the leg adapted to support the arms in a horizontal position, and a receptacle pivotally carried by the arms, the receptacle provided with a ledge which rests upon the arms, the ledge constituting a stop to limit the pivotal movement of the receptacle in either direction.

12. A bathing-pan comprising a body portion, an offset connected therewith, the offset provided with a cover, flanges located on the cover, between which flanges is formed a slot, braces secured to the pan and supporting the cover, a support pivotally secured to the braces, the support adapted to be received and locked in the slot between the flanges, and a tank carried by the support.

13. A bathing apparatus comprising a pan, a support capable of assuming two extreme positions with reference to the pan, a tank carried by the support and means for removably locking the support in either of its extreme positions.

14. A bathing apparatus comprising a pan, a rigid support pivotally secured thereto, means on the support coöperating with the pan for removably retaining the support in upright position, and a tank carried by the support, the tank provided with an outlet.

15. A bathing-pan comprising a body portion, a folding support pivotally connected therewith, a tank carried by the support, a flange on the tank provided with an aperture, and locking means adapted to enter the aperture in the flange to retain the support when folded in compact shape.

16. A bathing-pan comprising a body portion, an offset therefor, the offset provided with inclined top and sides, a spout in the upper portion of the offset, the top and sides of the offset inclining toward the spout and a handle located on the bathing-pan to permit the pan to be placed in a vertical position to empty any water held therein.

17. A bathing-pan comprising a body portion, a tube pivotally connected therewith, a locking means located on the tube, a post telescopically received within the tube and a tank carried by the post, the post adjustable as to height within the tube.

18. A bathing-pan comprising a body portion, a tube pivotally connected therewith, an automatic locking device located on the tube, a post telescopically received within the tube, the post provided with a series of recesses with which the locking device engages to support the tank at any desired height.

19. A bathing-pan comprising a body portion, a tube pivotally connected therewith, a removable sleeve in the tube, an automatic locking means carried by the sleeve, a post telescopically received in the tube, a tank carried by the post, the post provided with an enlarged end to prevent the removal of the sleeve therefrom.

20. A bathing apparatus comprising a pan, a rigid support pivotally secured to the pan, a tank carried by the support, the tank provided with an outlet, means for removably retaining the tank in an upright position, and means on the pan adapted to engage the tank for removably retaining the tank and support in the pan.

21. A bathing apparatus comprising a receptacle, a rigid support movably secured to the receptacle, a tank carried by the support, and means for removably retaining the support in either limit of movement with respect to the receptacle.

In testimony whereof I have signed this specification in the presence of two subscribing witnesses.

EDWARD PIERCE.

Witnesses:
V. A. JOHNSON,
W. C. AMBELANG.